June 25, 1940.　　　　C. BRONGERSMA　　　　2,205,787
ELECTRIC MOTOR CONTROL APPARATUS
Filed Sept. 6, 1938　　　　2 Sheets-Sheet 2
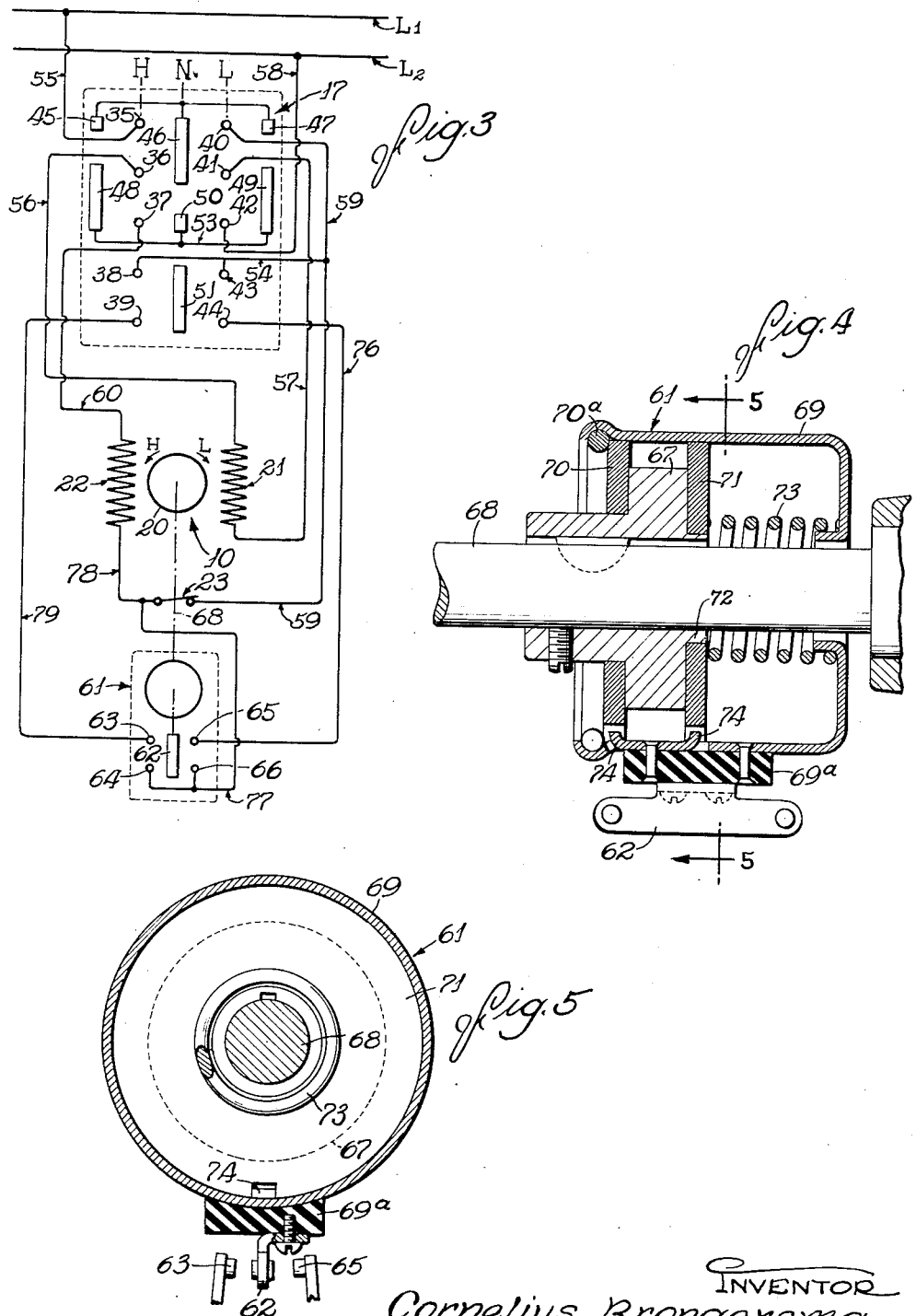
INVENTOR
Cornelius Brongersma
By Parker, Carlson, Pitzner & Hubbard
ATTORNEYS Patented June 25, 1940

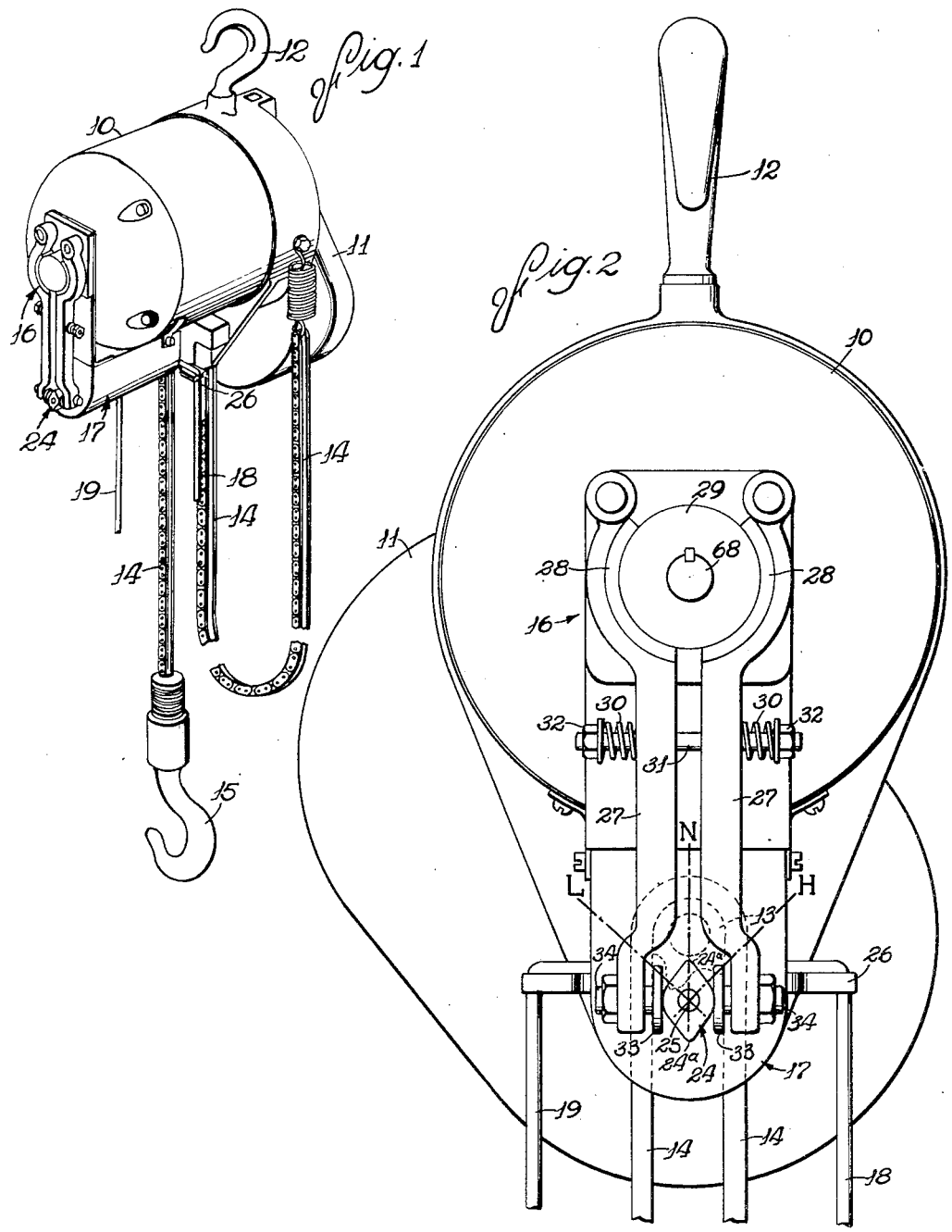

2,205,787

UNITED STATES PATENT OFFICE 2,205,787

ELECTRIC MOTOR CONTROL APPARATUS

Cornelius Brongersma, Muskegon Heights, Mich., assignor to Manning Maxwell & Moore, Inc., Muskegon, Mich., a corporation of New Jersey Application September 6, 1938, Serial No. 228,512

6 Claims. (Cl. 172—278)

The invention relates to electric motor controls and more particularly to such controls which are especially adapted for use in hoists in which a revoluble hoisting member having a hoist line reeved thereon is driven in opposite directions as required for hoisting and lowering by reversal of the associated driving motor as distinguished from reversal by means of a gear shift interposed between the hoisting member and a unidirectional driving motor.

The invention has been shown herein as embodied in an electric hoist which is in some respects an improvement on the form of electric hoist disclosed in the copending application of Preston Whitcomb and Ralph E. Smith, Serial No. 228,509, filed September 6, 1938. In this Whitcomb et al. application a hoist is disclosed embodying a single phase alternating current motor provided with a main winding and an auxiliary starting winding, which starting winding is cut out of circuit by a speed responsive switch after the motor has attained a predetermined speed. Although such motors are very inexpensive it is difficult to use them in installations where a reversible motor is required since they can only be reversed when the starting winding is in circuit. In other words, a simple reversal of voltage on the main winding when the motor is operating say for hoisting, will not serve to change the direction of the motor rotation. In the hoist disclosed in said Whitcomb et al. application, an arrangement is disclosed including a brake for automatically decreasing the rotor speed, in response to reversal of the main controller, so that the motor speed will be cut to a point at which the speed responsive switch throws the starting winding into circuit and in that way proper reversal of the motor is obtained.

The general object of the present invention is to provide for use in an electric hoist or the like embodying an electric driving motor of the general type described above, an improved electric control arrangement for positively insuring that the motor starting winding will be rendered operative to make possible reversal of the motor whenever the main controller of the motor is shifted from forward to reverse position of vice versa and irrespective of the speed at which the motor is operating.

A more specific object of the invention is to provide for use in a hoist or the like embodying an electric motor of the type described, a mechanical control arrangement for accomplishing its reversal of the general form disclosed in the copending application of Whitcomb et al. noted above, but supplemented by an improved form of electrical control herein disclosed which makes virtually impossible any failure in reversal of the motor no matter how careless or inadept the operator may be.

Further objects and advantages of the invention will become apparent as the following description proceeds taken in connection with the accompanying drawings in which:

Figure 1 is a general perspective view of an electric hoist embodying the invention.

Fig 2 is an enlarged end elevation of the brake end of the hoist shown in Fig. 1.

Fig. 3 is a wiring diagram of the electrical control arrangement for the driving motor of the hoist of Fig. 1.

Fig. 4 is an enlarged detail vertical sectional view of the motor shaft-operated switch included in the control mechanism.

Fig. 5 is a detail plan view of the switch of Fig. 4 with the cover broken away.

Although the invention is applicable to various types of installations and hoists it finds particular utility in small portable hoists in view of the fact that motors of the type contemplated for use therewith are usually made in small or fractional horsepower sizes. The particular hoist selected for illustration of the various novel features of the invention embodies in general an electric driving motor 10 bolted to one end face of a gear case 11 and supported as a unitary structure therewith by a hook 12. The motor 10 drives a suitable revoluble hoisting member, such as a pinion 13 (Fig. 2) through the medium of a speed reduction gearing enclosed by the gear case 11. The pinion 13 is disposed below the motor 10 in general vertical alinement with the supporting hook 12, and a suitable hoist line, such as a roller type chain 14, is reeved over the pinion with one end of the chain made fast to the gear case 11 and with the other end hanging free for hoisting, a load hook 15 being attached to its lower end. A brake mechanism, designated generally by the numeral 16, for holding the motor 10 and driven pinion 13 against rotation when the motor is stopped, is mounted on the outboard end of the motor. Also a reversing controller 17, operated through the medium of a pair of control cords 18 and 19, is secured to the lower side of the motor. It will be understood that the particular location or arrangement of the parts of the hoist forms no part of the present invention and may be varied as necessity or expediency require.

A marked saving in the cost of the type of hoist described can be achieved by utilizing a small single phase alternating current motor of the type embodying a starting winding which is cut out of circuit, as for example by a speed responsive switch, when the motor is operating above a predetermined speed. The motor 10 may, for example, be of the split phase type and embody a rotor 20 (Fig. 3) a main field winding 21 and an auxiliary or starting field winding 22. For the sake of economy the starting winding 22 is made to have a relatively low current carrying capacity and hence cannot be left in circuit during the normal or continuous operation of the motor without being burned out. Accordingly a speed responsive switch 23 is arranged to open circuit the starting winding and thus deenergize the same when the motor attains a predetermined speed. The switch 23 will of course reclose when the motor is decelerated although at a somewhat lower speed than that at which it opens, due to the sluggishness of most of such switches. The speed responsive switch may be of the conventional centrifugal type such as is ordinarily incorporated in such motors. If desired a condenser may be inserted in series with the starting winding 22 in order to further modify the phase of the current flowing through it with respect to the phase of the current in the main winding. Motors of the type described are made by quantity production methods for many types of unidirectional drive installations such as that encountered in washing machines and hence may be procured at low cost. This cost factor makes it desirable to utilize such a motor in an electric hoist but the inherent characteristics of the motor hereinafter pointed out make it impossible for such a motor to meet the peculiar requirements of a hoist installation without the provision of special associated apparatus.

Reversal of the motor described can only be accomplished when the starting winding is energized. In other words when the motor is installed in a hoist and is operating at full speed in one direction, as for example in a direction to lower the load, a reversal of the instantaneous polarity of the voltage applied to the main winding will not cause the motor to reverse but will simply serve to continue rotation of the motor in the same direction. To use the ordinary electrical engineering parlance the motor cannot be "plugged." Serious difficulties will, therefore, arise if an attempt is made to substitute a motor of the type described for the more expensive type of reversible motors ordinarily supplied on hoisting apparatus. First of all, the ordinary hoist controller simply reverses the voltage applied to the motor and as was noted above such a reversal of voltage on a starting winding motor like that described not only will fail to reverse it but will in fact cause it to continue to operate in its previous direction of rotation. Second, if the hoist is loaded and its brake released prior to the application of voltage to the motor, as sometimes happens in many control arrangements, the motor will attain such a speed due to the gravitational descent of the load that the speed responsive switch will be opened to open-circuit the starting winding before any voltage is applied to the motor. Accordingly, when the voltage is applied, with the starting winding open, the effect will be to cause the motor to continue lowering the load even if the motor controller has been set for hoisting. It is manifest that both of these difficulties must be eradicated if the hoist is to be at all practical or satisfactory in operation.

In accordance with the present invention an electric control arrangement is included in the hoist which serves positively to insure energization of the starting winding upon reversel of the hoist controller irrespective of the action of the speed responsive switch which normally controls the starting winding. Preferably this electric control arrangement is used in conjunction with or as supplemental to what may be termed a mechanical control arrangement of the general type disclosed in the Whitcomb et al. application referred to above. Turning first to this mechanical control arrangement, it embodies in general a diamond-shaped cam 24 fast on the outer end of a rock shaft 25 included in the controller 17. A cross arm 26 fixed on this rock shaft, and carrying the control cords 18—19 on its outer ends, is utilized to shift the controller from its central neutral position shown in Fig. 2 alternatively to hoisting or lowering positions indicated by the dot-dash lines marked H and L, respectively (Fig. 2). The cam 24 is arranged to actuate the brake mechanism 16 in timed relation to the actuation of the control 17. For this purpose the brake mechanism includes a pair of arms 27 fast on a pair of opposed pivoted brake shoes 28, which embrace a brake drum 29 keyed on the end of the motor shaft. The brake shoes 28 are yieldably pressed into engagement with the brake drum by a pair of compression springs 30 encircling a pin 31 and interposed between the outer faces of the arms 27 and nuts 32 threaded on the ends of the pin 31. A pair of abutments 33 adjustably mounted on pins 34 threaded in the lower ends of the arms 27 are opposed to opposite sides of the cam 24. Accordingly, when the rock shaft 25 is oscillated either to hoisting or lowering positions the high points 24a on the cam 24 engage the abutments 33 and force the brake arms 27 apart so as to release the brake. The cam 24 is contoured that when properly adjusted the brake will be released at substantially the same instant at which the controller contacts are closed for either hoisting or lowering. This synchronization of the release of the brake and closing the controller contacts, obviates the possibility of a gravitational descent of the load on the hoist with consequent rotation of the motor before current is supplied to it.

The improved electrical control arrangement herein contemplated may best be understood by reference to the wiring diagram in Fig. 3. As a preliminary to an explanation of the safety control features, the main control parts will first be identified. The controller 17 includes two spaced rows of fixed contacts 35–39 and 40–44 as well as a rotor carrying movable contacts 45–51. These movable contacts are shifted by the controller rock shaft 25. It will be understood that the controller has been shown in Fig. 3 in developed or schematic form. The movable contacts 45–47 are interconnected by a conductor 52, the contacts 48–50 by conductor 53 and the fixed contacts 38 and 43 by conductor 54. Current is supplied to the driving motor 10 from suitable alternating current supply lines $L_1$ and $L_2$. When the controller is in the position shown in Fig. 3, the motor is open-circuited and hence stopped. Upon shifting the controller movable contacts to the left for hoisting, the main winding 21 of the driving motor 10 is energized (through a circuit $$L_1-55-35-46-36-56-21-57-41-49-42-58-L_2)$$

and similarly when the controller movable contacts are shifted to the right the motor main winding is connected across the supply lines in an opposite sense (through a circuit $$L_1-55-35-45-52-46-41-57-21-56-36-48-53-50-42-58-L_2).$$

It will be noted that when the controller 17 is shifted to hoisting position that the motor starting winding 22 is also energized (through a circuit $$L_1-55-35-46-52-47-40-59-23-22-60-37-50-53-49-42-58-L_2)$$

and also when the controller is shifted to lowering position the starting winding is again connected in circuit but in the same sense (through a circuit $$L_1-55-35-45-52-46-40-59-23-22-60-37-48-53-50-42-58-L_2).$$

As to the starting winding 22, it will be noted that in each case the circuits set forth above include the speed responsive switch 23. Accordingly if only the circuits described above were relied upon for control of the motor, the starting winding would not be energized in the event that the controller was shifted while the motor was rotating at high speed and hence with the switch 23 open. The brake mechanism tends to slow down the motor upon reversal of the controller so that the speed responsive switch will close. In case the brake is worn or for some other reason, the speed responsive switch may, however fail to close. The auxiliary control apparatus hereinafter described is adapted to obviate this possibility.

The supplemental electrical control apparatus is in general designed to insure energization of the starting winding 22 whenever the controller 17 is shifted from hoisting to lowering position or vice versa irrespective of whether or not the speed responsive switch 23 is closed. For this purpose two circuits are provided for shunting the speed responsive switch. Interposed in these circuits are contacts 38, 39, 43 and 44 on the main controller 17 as well as a plurality of contacts controlled by a switch designated generally by the numeral 61. This switch 61 embodies a movable contact 62 adapted to bridge either fixed contacts 63—64 or 65—66 depending upon the direction of rotation of the motor shaft. The movable contact 62 is carried by a member which frictionally engages the shaft so that the movable contact is yieldably urged in the direction of shaft rotation. Figs. 4 and 5, show an illustrative form for the switch mechanism 61 although various changes in structure may be made if desired.

In the particular mechanism shown, the switch 61 includes a friction collar 67 fast on shaft 68 of the motor 10 and enclosed by a sheet metal housing 69. Annular friction washers 70 and 71 are disposed on opposite sides of the collar 67, the washer 70 being pressed against a snap ring 70a in the base of the housing 69 while the washer 71 is slidably mounted on a reduced end portion 72 of the collar 67. A helical compression spring 73, interposed between the outer face of the washer 71 and the adjacent inner face of the housing 69, yieldably urges the washers 70—71 into engagement with the opposite faces of the collar 67. Ears 74 struck out from the housing 69 engage complemental notches in the disks 70—71 so as to prevent relative rotation between these parts. A block 69a secured to the periphery of the housing 69 insulatingly supports the contact 62. Accordingly, if the motor shaft 68 is rotated in a clockwise direction (as viewed in Fig. 3), the movable contact 62 will be swung to a position in which it bridges fixed contacts 63—64, and similarly if the motor shaft is rotated in a counterclockwise direction, the movable contact 62 is shifted to bridge the fixed contacts 65—66. Such bridging of these contacts serves to prepare a circuit, although not to complete it as yet, for shunting the speed responsive switch 23 upon a subsequent reversal of the controller.

As an example of the supplemental control circuit operation if, after the motor has been running in the hoisting direction for a desired period, the operator then pulls on the control cord 19 the controller 17 is shifted to its lowering position. In such case the instantaneous polarity of the voltage applied to the main motor winding 21 is reversed as described above. At the same time the fixed controller contacts 43—44 are bridged by the movable contact 51 which serves to shunt out the speed responsive switch 23 and energize the starting winding 22 (through a circuit $L_1-55-35-45-52-46-40-59-54-43-51-44-76-65-62-66-77-78-22-60-37-48-53-50-42-58-L_2)$. In the same way if the motor has been rotating for lowering, and the controller 17 is shifted to the hoisting position, the starting winding 22 is automatically cut in circuit by bridging of the controller contacts 38—39 by the contact 51 and through the previously closed contacts 63—64 (through a circuit $L_1-55-35-46-52-47-40-59-54-38-51-39-79-63-62-64-77-78-22-60-37-50-53-49-42-58-L_2)$. It will thus be seen that there is no possibility, with the arrangement described, of reversing the voltage on the main winding 21 without cutting the starting winding 22 into circuit. In other words, even if the brake mechanism 16 should become worn or inoperative for any reason so that the motor is not slowed down sufficiently by the brake to cause the speed responsive switch 23 to close during the reversal operation, nevertheless the starting winding will be energized in any event through the auxiliary switch mechanism 61.

Although a particular embodiment of the invention has been shown and described in some detail for purposes of illustration of the invention, there is no intention thereby to limit the invention to such embodiment but on the other hand the appended claims are intended to cover all modifications and alternative constructions falling within the spirit and scope of the invention.

I claim as my invention:

1. In a control apparatus for a reversible single phase alternating current motor embodying a main winding and an auxiliary starting winding, the combination of a speed responsive switch for deenergizing said starting winding when said motor is operating at a speed in excess of a predetermined value, means including a reversing controller for said motor movable from a neutral position alternatively to a forward or reverse position for open-circuiting said motor when in neutral position and for connecting the same to a supply line in respectively reversed senses in its forward or reverse positions, and characterized by the provision of means operable in response to movement of said controller from forward to reverse position or vice versa for completing an energizing circuit for said starting winding which is independent of said speed responsive switch to insure reversal of said motor.

2. In a control apparatus for a reversible single phase alternating current motor embodying a main winding and an auxiliary starting winding, the combination of a speed responsive switch for deenergizing said starting winding when said motor is operating at a speed in excess of a predetermined value, means including a reversing controller for said motor movable from a neutral position alternatively to a forward or reverse position for open-circuiting said motor when in neutral position and for connecting the same to a supply line in respectively reversed senses in its forward or reverse positions, means including an auxiliary control switch connected in shunt relation with said speed responsive switch for rendering the latter inoperative to deenergize said starting winding, and means responsive to a shift of said controller from forward to reverse position and vice versa for actuating said auxiliary control switch to render said speed responsive switch inoperative to deenergize said starting winding.

3. In a control apparatus for a reversible single phase alternating current driving motor embodying a main winding and an auxiliary starting winding, the combination of means including a speed responsive switch for deenergizing said starting winding when the speed of said motor exceeds a predetermined value, means including a reversing controller for said motor movable from a neutral position alternatively to forward and reverse positions for open-circuiting said motor when in neutral position and for connecting the same to a supply line in respectively reversed senses in its forward and reverse positions, means including an auxiliary circuit having two sets of contacts therein for completing an energizing circuit for said starting winding when both of said sets of contacts are closed, means responsive to rotation of said motor in its forward direction for closing one of said sets of contacts, and means responsive to a shift of said controller from forward to reverse position for closing the other of said sets of contacts.

4. In a control apparatus for a single phase alternating current motor embodying a main winding and an auxiliary starting winding, the combination of means including a speed responsive switch for deenergizing said starting winding when said motor is operating at a speed in excess of a predetermined value, means including a reversing controller for said motor movable from a neutral position alternatively to a forward or reverse position for open-circuiting said motor when in neutral position and for connecting the same to a supply line in respectively reversed senses in the forward and reverse positions, a circuit connected in shunt with said speed responsive switch and having a plurality of sets of series-connected contacts interposed therein, means responsive to rotation of said motor for closing at least one of said sets of contacts, and means responsive to shifting of said controller from forward to reverse position or vice versa, for completing one of said shunt circuits by closure of at least one or the other of said sets of contacts to insure positively a reversal of the motor by energization of said starting winding irrespective of the previous operation of the motor for either forward or reverse rotation.

5. In a control apparatus for a reversible single phase alternating current motor embodying a main winding and an auxiliary starting winding, the combination of means including a speed responsive switch connected in series relation with said starting winding for open-circuiting the same when said motor is operating at a speed in excess of a predetermined value, means including a reversing controller for said motor movable from a neutral position alternatively to a forward or reverse position for open-circuiting said motor when in neutral position and for connecting the same to a supply line in respectively reversed senses in the forward and reverse positions, first and second circuits connected in shunt relation with said speed responsive switch, each of said circuits having two series-connected sets of normally open contacts interposed therein, means responsive to the direction of rotation of said motor for closing one set of contacts in one or the other of said circuits depending upon the direction of motor rotation and preparatory to completion of the circuit in which the one set of contacts is closed upon a subsequent reversal of the motor, and means responsive to shifting of said controller from forward to reverse position or vice versa for closing the second set of contacts in the circuit in which the other set has been previously closed by said last mentioned means, thereby to insure positively a reversal of the motor by energization of said starting winding irrespective of the previous operation of the motor for either forward or reverse rotation.

6. In a control apparatus for a single phase alternating current motor embodying a main winding and an auxiliary starting winding, the combination of a speed responsive switch for deenergizing said starting winding when said motor is operating at a speed in excess of a predetermined value, means including a reversing controller for said motor movable from a neutral position alternatively to a forward or reverse position for open-circuiting said motor when in neutral position and for connecting the same to a supply line in respectively reversed senses in the forward and reverse positions, means including a brake for releasably holding said motor against rotation, means for setting said brake in response to movement of said controller to neutral position and for releasing said brake only at substantially the instant a circuit for said motor is completed by said controller for either forward or reverse movement to prevent drift of said motor when the motor is deenergized and the brake released, and means responsive to a shift of said controller from forward to reverse position or vice versa for completing an energizing circuit for said starting winding independently of said speed responsive switch and thereby positively insure reversal of said motor.

CORNELIUS BRONGERSMA.